United States Patent
Hiji et al.

(10) Patent No.: US 10,703,043 B2
(45) Date of Patent: Jul. 7, 2020

(54) SHAPING APPARATUS USING COATING LIQUID ON AN OBJECT

(71) Applicant: FUJI XEROX CO., LTD., Tokyo (JP)

(72) Inventors: Naoki Hiji, Kanagawa (JP); Torahiko Kanda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 228 days.

(21) Appl. No.: 15/698,896

(22) Filed: Sep. 8, 2017

(65) Prior Publication Data
US 2018/0200953 A1 Jul. 19, 2018

(30) Foreign Application Priority Data
Jan. 18, 2017 (JP) ................. 2017-006603

(51) Int. Cl.
| B29C 64/209 | (2017.01) |
| B33Y 30/00 | (2015.01) |
| B33Y 50/02 | (2015.01) |
| B29C 64/112 | (2017.01) |
| B29C 64/227 | (2017.01) |
| G05B 19/4099 | (2006.01) |
| B29C 64/40 | (2017.01) |

(52) U.S. Cl.
CPC .......... B29C 64/209 (2017.08); B29C 64/112 (2017.08); B33Y 30/00 (2014.12); B33Y 50/02 (2014.12); B29C 64/227 (2017.08); B29C 64/40 (2017.08); G05B 19/4099 (2013.01); G05B 2219/49013 (2013.01)

(58) Field of Classification Search
CPC .................................................. B29C 64/209
See application file for complete search history.

(56) References Cited

U.S. PATENT DOCUMENTS

| 7,685,694 B2 * | 3/2010 | Zagagi | B29C 70/68 29/458 |
| 9,688,021 B2 | 6/2017 | Ravich et al. | |
| 10,099,406 B2 * | 10/2018 | Chechik | B29C 41/48 |
| 2016/0001504 A1 | 1/2016 | Ikeda et al. | |
| 2016/0039152 A1 * | 2/2016 | Hara | B29C 67/0092 264/308 |
| 2017/0087772 A1 * | 3/2017 | Hakkaku | B33Y 30/00 |
| 2018/0050489 A1 * | 2/2018 | Okawa | B29C 64/124 |
| 2018/0056583 A1 * | 3/2018 | Ochi | B33Y 10/00 |
| 2018/0085997 A1 * | 3/2018 | Tsunoya | B33Y 10/00 |

FOREIGN PATENT DOCUMENTS

| JP | 2016-016568 A | 2/2016 |
| JP | 2016-047651 A | 4/2016 |

* cited by examiner

*Primary Examiner* — Jacob T Minskey
*Assistant Examiner* — Virak Nguon
(74) *Attorney, Agent, or Firm* — Sughrue Mion, PLLC

(57) ABSTRACT

A shaping apparatus includes a table, at least one first discharging part that moves in one direction relative to the table and shapes an object by discharging droplets of a shaping liquid from nozzles and stacking plural layers each formed by curing the droplets, a second discharging part that moves in one direction relative to the table and forms a coating member coating an end surface of the object by discharging droplets of a coating liquid from nozzles and stacking plural layers each formed by curing the droplets, and a controller that controls the second discharging part so that a thickness of the coating member decreases toward an upper side.

11 Claims, 15 Drawing Sheets

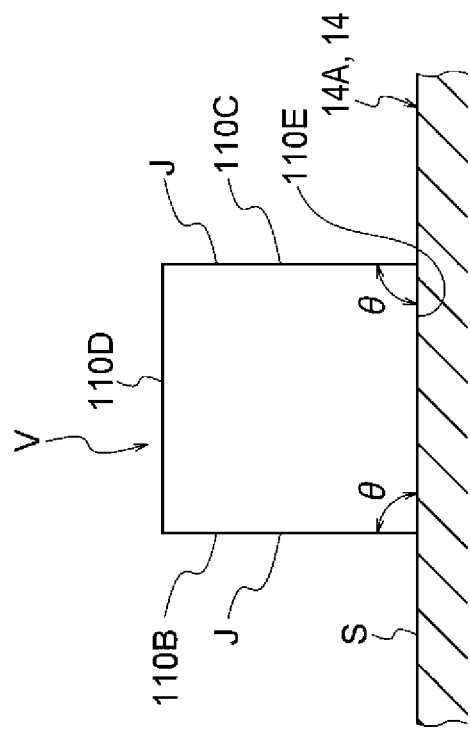
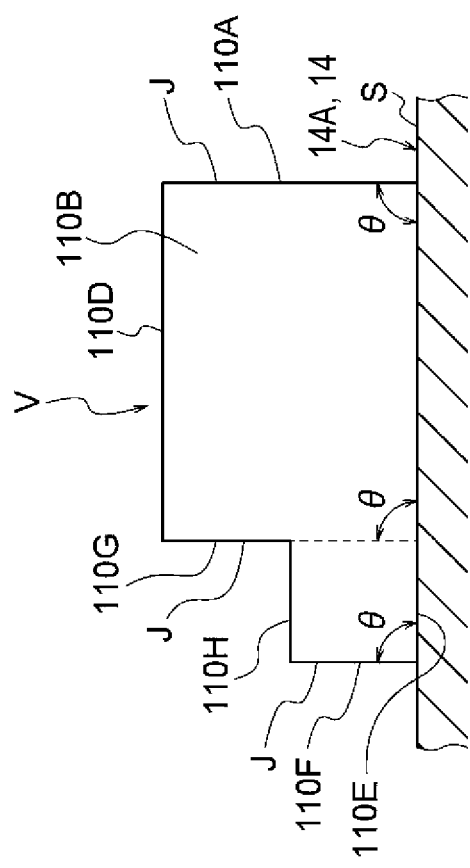

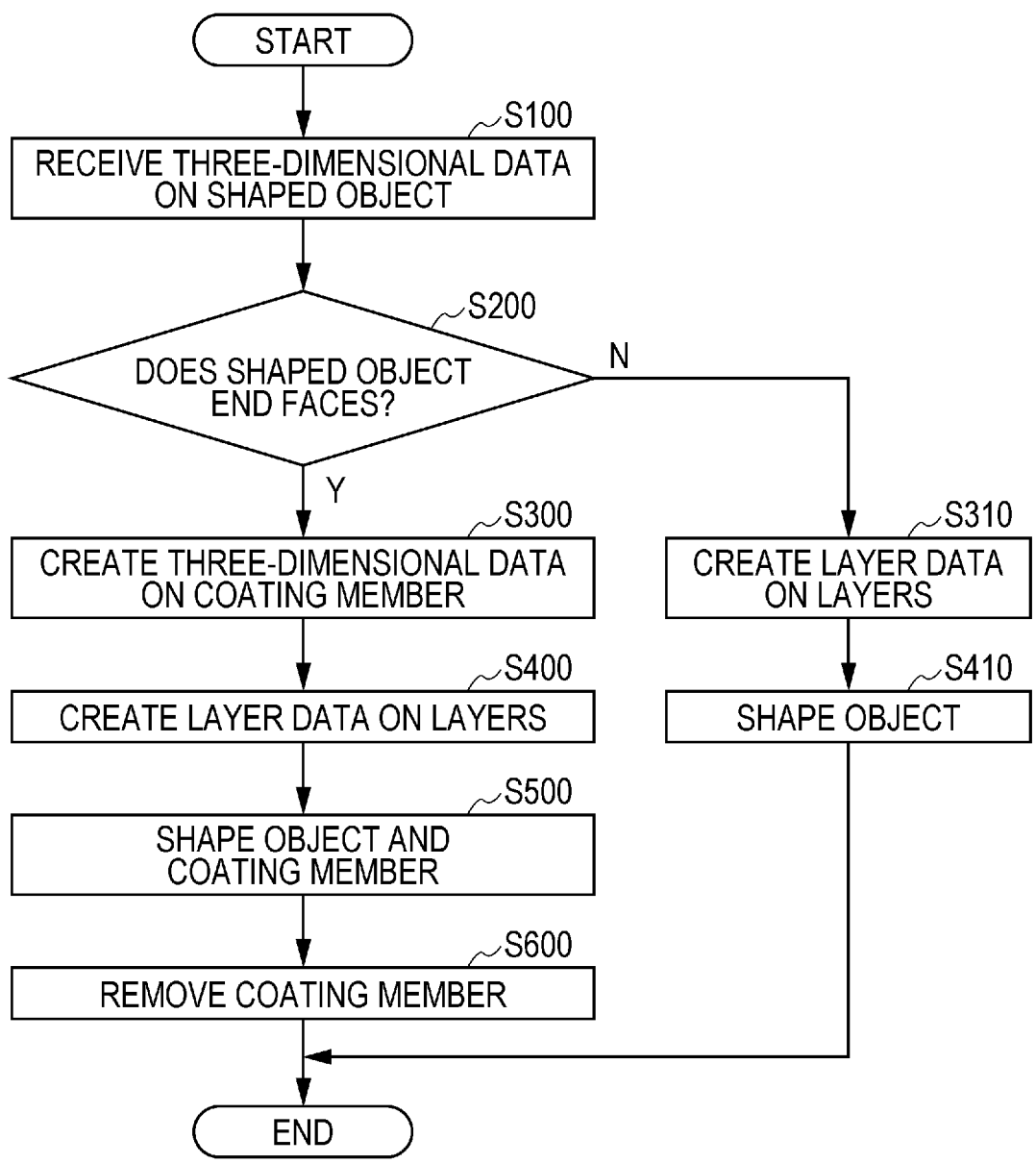

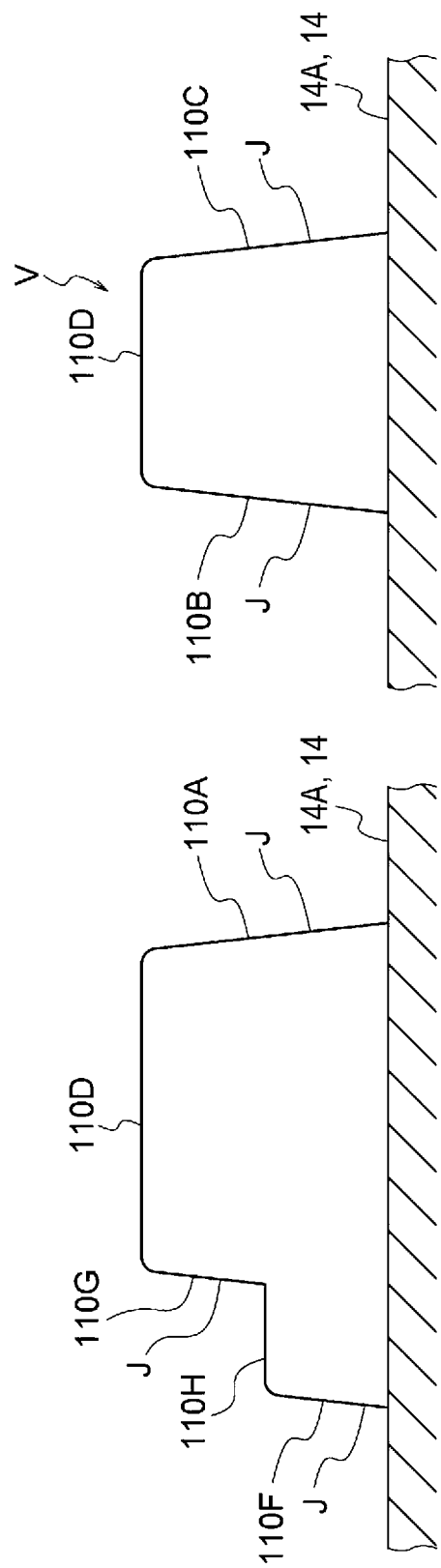

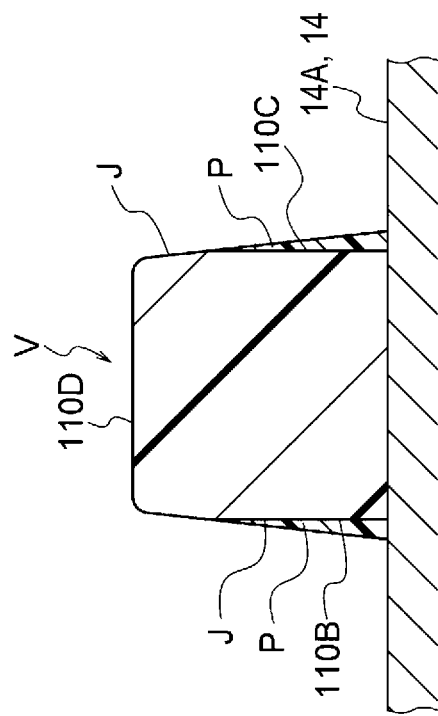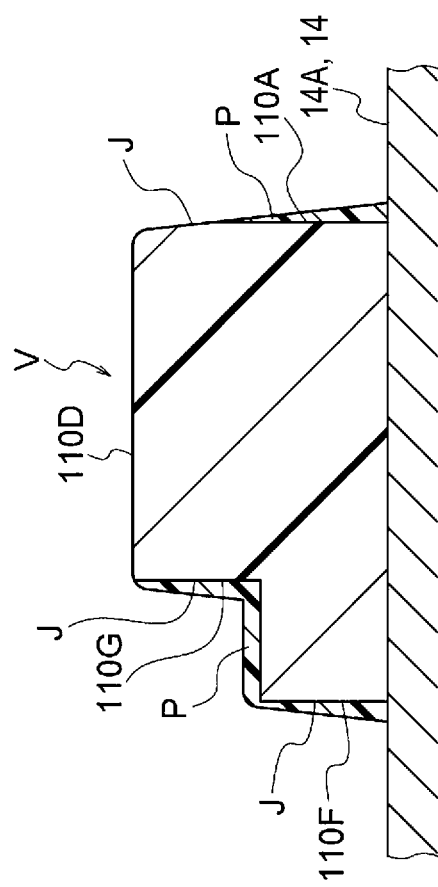

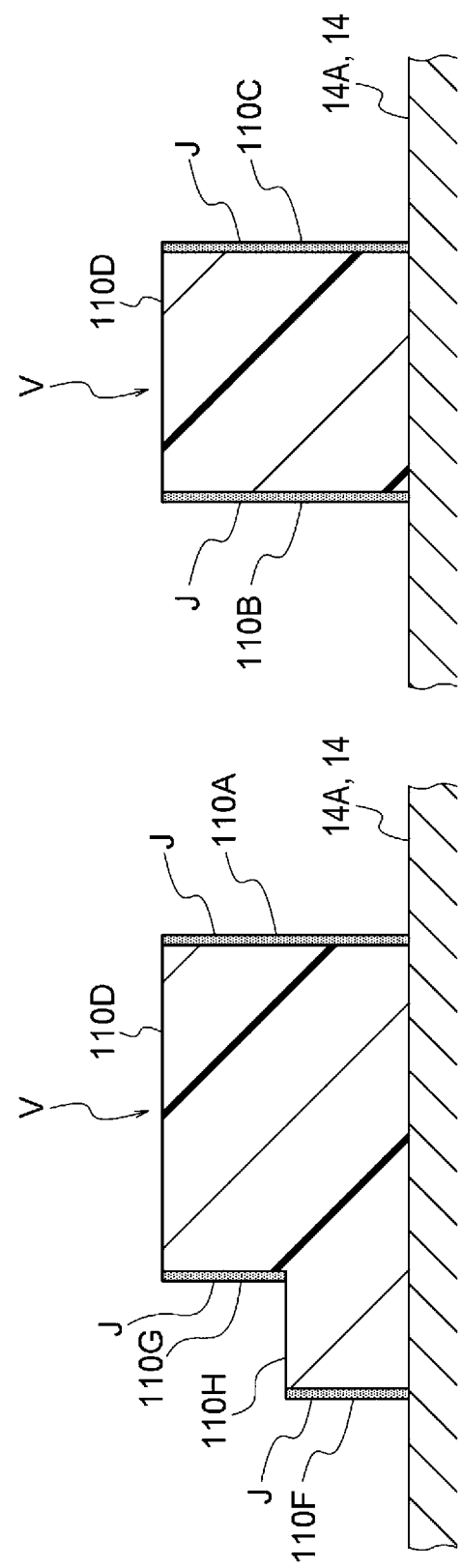

SHAPING APPARATUS USING COATING LIQUID ON AN OBJECT

CROSS-REFERENCE TO RELATED APPLICATIONS

This application is based on and claims priority under 35 USC 119 from Japanese Patent Application No. 2017-006603 filed Jan. 18, 2017.

BACKGROUND

Technical Field

The present invention relates to a shaping apparatus.

SUMMARY

According to an aspect of the invention, there is provided a shaping apparatus including a table, at least one first discharging part that moves in one direction relative to the table and shapes an object by discharging droplets of a shaping liquid from nozzles and stacking plural layers each formed by curing the droplets, a second discharging part that moves in one direction relative to the table and forms a coating member coating an end surface of the object by discharging droplets of a coating liquid from nozzles and stacking plural layers each formed by curing the droplets, and a controller that controls the second discharging part so that a thickness of the coating member decreases toward an upper side.

BRIEF DESCRIPTION OF THE DRAWINGS

Exemplary embodiments of the present invention will be described in detail based on the following figures, wherein:

FIGS. 3A and 3B are a front view and a side view, respectively, of the object shaped by the shaping apparatus of the first exemplary embodiment;

FIG. 5 is a flowchart showing the steps of shaping the object in the shaping apparatus of the first exemplary embodiment;

FIGS. 11A and 11B are a front view and a side view, respectively, of an object shaped by the shaping apparatus of the first comparative example;

FIGS. 12A and 12B are a front view and a side view, respectively, of an object shaped by a shaping apparatus according to a second comparative example of the present invention;

FIGS. 14A and 14B are cross-sectional views of an object shaped by a shaping apparatus according to a second exemplary embodiment of the present invention.

DETAILED DESCRIPTION

First Exemplary Embodiment

A shaping apparatus according to a first exemplary embodiment of the present invention will be described with reference to FIGS. 1 to 12. In these figures, arrow H represents an apparatus up-down direction (vertical direction), arrow W represents an apparatus width direction (horizontal direction), and arrow D represents an apparatus depth direction (horizontal direction).

Overall Configuration

A shaping apparatus 10 according to the first exemplary embodiment is a so-called three-dimensional printer, and shapes an object V by stacking plural layers while repeating discharging of a shaping liquid and curing of the shaping liquid by irradiation with ultraviolet light according to layer data on the plural layers.

Figure 6:
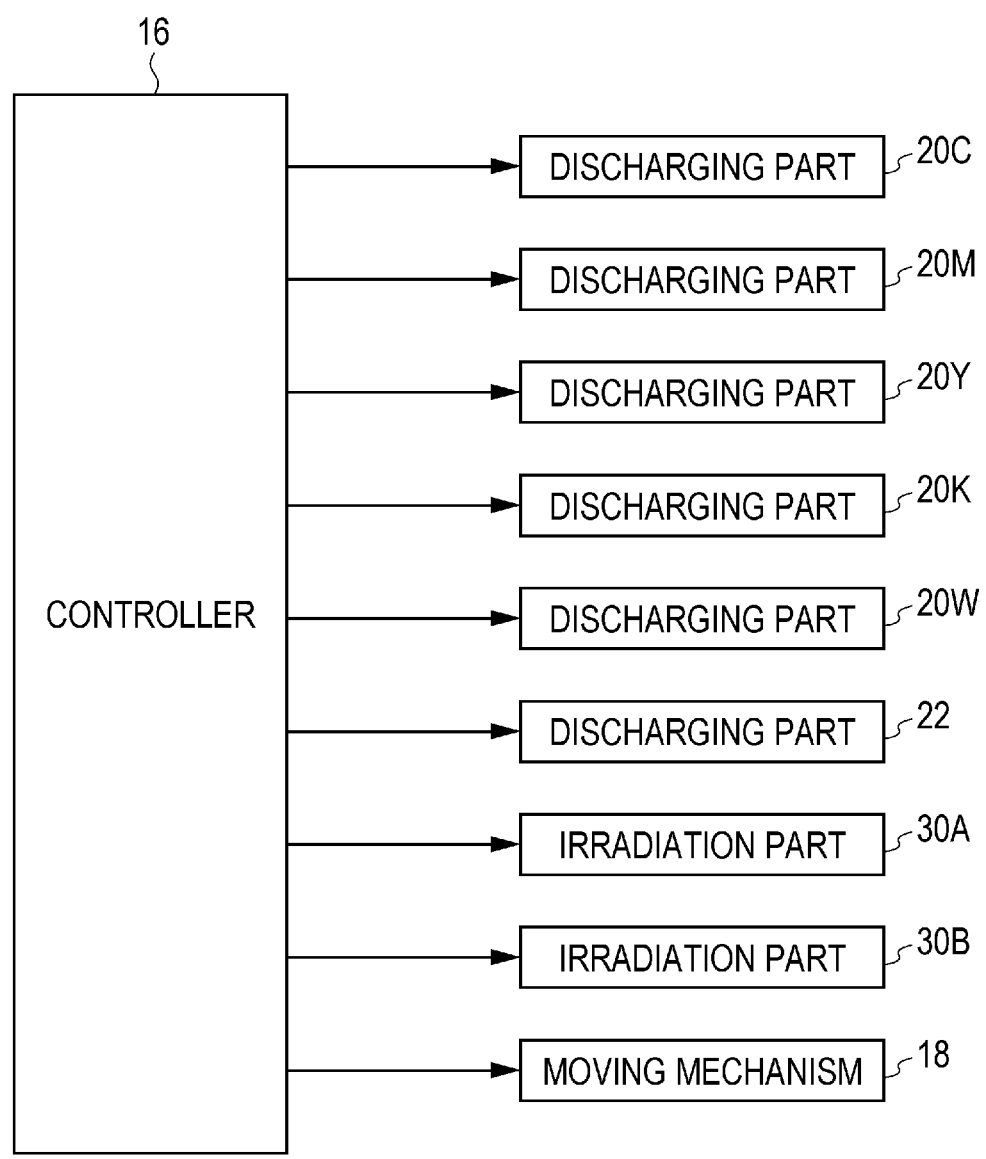
FIG. 6 is a block diagram showing a control system of a controller provided in the shaping apparatus of the first exemplary embodiment.
Figure 7:
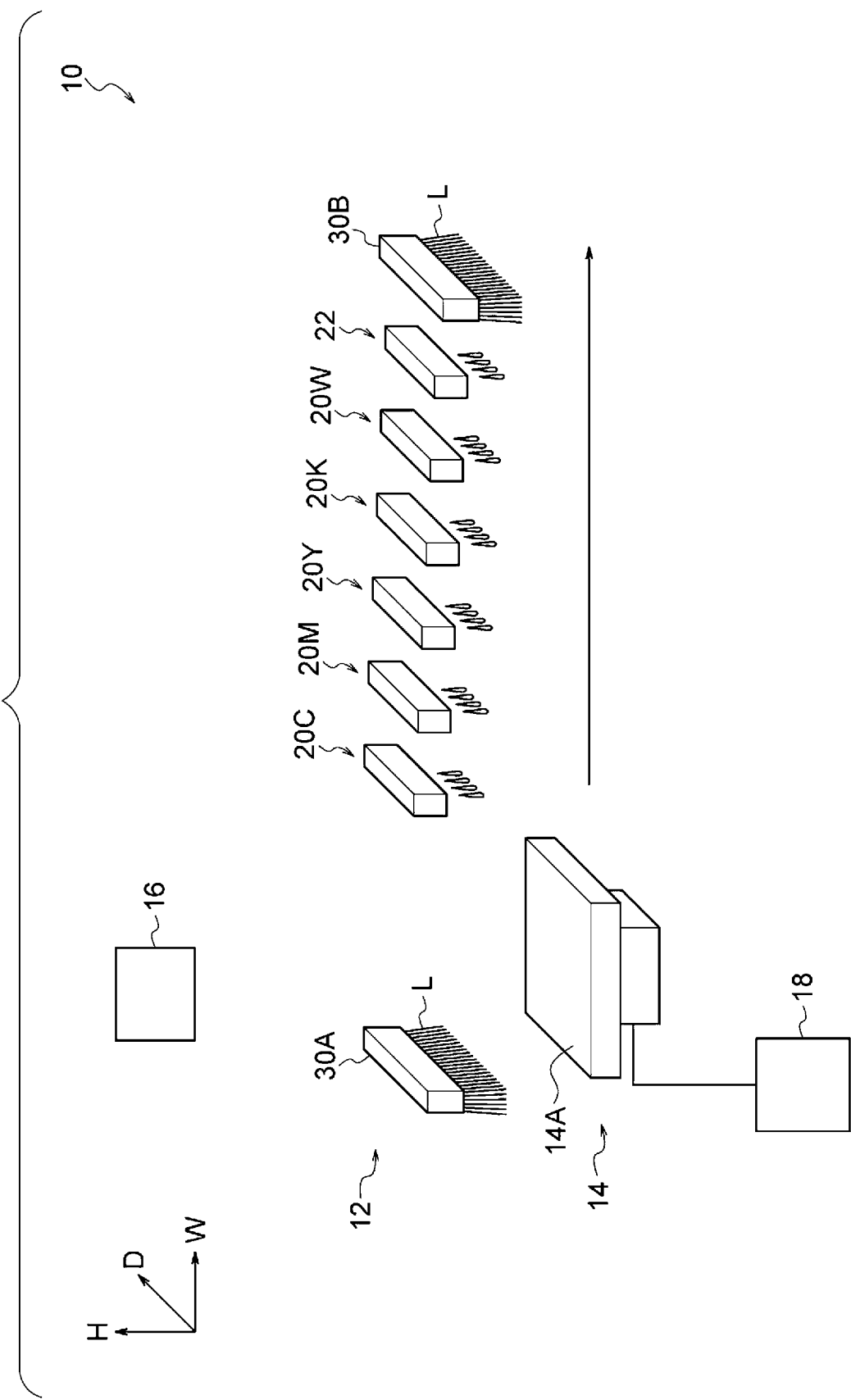
FIG. 7 is a schematic structural view of the shaping apparatus of the first exemplary embodiment.

As illustrated in FIG. 7, the shaping apparatus 10 includes a shaping unit 12, a table unit 14 disposed below the shaping unit 12, a moving mechanism 18 that moves the table unit 14, and a controller 16 that controls the units (see FIG. 6).

Shaping Unit

The shaping unit 12 includes discharging parts 20C, 20M, 20Y, 20K, 20W, and 22 and irradiation parts 30A and 30B held by an unillustrated holding member.

Discharging Parts

As illustrated in FIG. 7, the shaping unit 12 includes discharging parts 20C, 20M, 20Y, 20K, and 20W having nozzles for respectively discharging droplets of shaping liquids of cyan (C), magenta (M), yellow (Y), black (K), and white (W). The shaping unit 12 further includes a discharging part 22 having nozzles for discharging droplets of a coating liquid to be a coating member P that coats an end surface J of an object V (see FIG. 1A). The end surface J refers to a surface of the object V that faces sideward (in a direction intersecting the discharging direction of the droplets) and is at an angle θ within a range of 80 to 90 degrees to a horizontal surface S (a base surface 14A to be described later in the first exemplary embodiment), as illustrated in FIG. 3A. The discharging parts 20C, 20M, 20Y, 20K, and 20W are an example of a first discharging part, and the discharging part 22 is an example of a second discharging part.

Specifically, each of the discharging parts 20C, 20M, 20Y, 20K, and 20W and the discharging part 22 has nozzles (not illustrated) arranged in the apparatus depth direction (main scanning direction) to discharge droplets. The above-described droplets are discharged from these nozzles.

As illustrated in FIG. 7, in the apparatus width direction (sub-scanning direction), the discharge parts 20C, 20M, 20Y, 20K, and 20W and the discharging part 22 are arranged in this order from one side (left side in FIG. 7) to the other side (right side in FIG. 7) in the apparatus width direction, and are spaced from one another.

The coating member P (coating liquid) used in the first exemplary embodiment is an ultraviolet transmitting material that transmits ultraviolet light after curing. Here, the ultraviolet transmitting material is such a material that the ultraviolet transmittance of a sample thereof with a thickness of 20 µm for a wavelength within the range of 365 to 410 nm is more than or equal to 70% and less than 100% after curing. The ultraviolet transmittance is measured with an UV-visible spectrophotometer (tradename: U-570 from JASCO Corporation). For example, the following mixed composition may be used as the ultraviolet-transmitting material:

Polyether polyol, ADEKA polyether P-400 (from ADEKA) 40 parts by weight

Urethane acrylate oligomer, U-200 PA (from Shin-Nakamura Chemical Co., Ltd.) 7.62 parts by weight Urethane acrylate oligomer, UA-4200 (from Shin-Nakamura Chemical Co., Ltd.) 9.48 parts by weight Acrylate monomer, 2-(2-vynyloxyethoxy) ethylacrylate (from Nippon Shokubai Co., Ltd.) 30.24 parts by weight Acrylate monomer, Isobornyl acrylate (from OSAKA ORGANIC CHEMICAL INDUSTRY LTD.) 8.76 parts by weight Polymerization inhibitor, Hydroquinone monomethyl ether (from Tokyo Chemical Industry Co., Ltd.) 0.3 parts by weight Photopolymerization initiator, LUCIRIN TPO (2,4,6-trimethylbenzoyl-diphenyl-phosphine oxide) (from BASF SE) 1.8 parts by weight Photopolymerization initiator, Irgacure 379 (2-dimethylamino-2-(4-methyl-benzyl)-1-(4-morpholin-4-yl-phenyl)-butan-1-one) (from BASF SE) 0.6 parts by weight Sensitizer, 2-isopropylthioxanthone (from Tokyo Chemical Industry Co., Ltd.) 0.6 parts by weight Surfactant, TEGO Wet 270 (Polyether modified siloxane copolymer) (from Evonik Industries) 0.12 parts by weight When Y, M, C, K, and W do not need to be distinguished in the following description, they are sometimes omitted.

Irradiation Parts

As illustrated in FIG. 7, the shaping unit 12 includes an irradiation part 30A disposed on one side of the discharging part 20C in the apparatus width direction to apply irradiation light serving as ultraviolet light, and an irradiation part 30B disposed on the other side of the discharging part 22 in the apparatus width direction to apply irradiation light L serving as ultraviolet light. When A and B do not need to be distinguished in the following description, they are sometimes omitted.

Table Unit and Moving Mechanism

The table unit 14 is disposed below the shaping unit 12, and has a base surface 14A disposed as a horizontal surface facing toward the shaping unit 12. The table unit 14 is an example of a table.

The moving mechanism 18 moves the table unit 14 relative to the shaping unit 12 in the apparatus width direction.

In the above-described structure, the discharging parts 20 and 22 discharge droplets onto the base surface 14A of the table unit 14 moved by the moving mechanism 18. The irradiation parts 30 cure the droplets discharged from the discharging parts 20 and 22 onto the base surface 14A by irradiating the droplets with ultraviolet light. By repeating this operation, plural layers are stacked on the base surface 14A to shape an object V.

Controller

The controller 16 (see FIG. 6) controls the units and parts that constitute the shaping apparatus 10. Control of the controller 16 over the units and parts will be described later in conjunction with the operation.

Operation

Next, a description will be given of a method for shaping (producing) an object V by using the shaping apparatus 10. First, the outline of the shaping method will be described, the shape of the object V will be described, and the shaping method will then be described in detail.

Outline of Shaping Method

Figure 8:
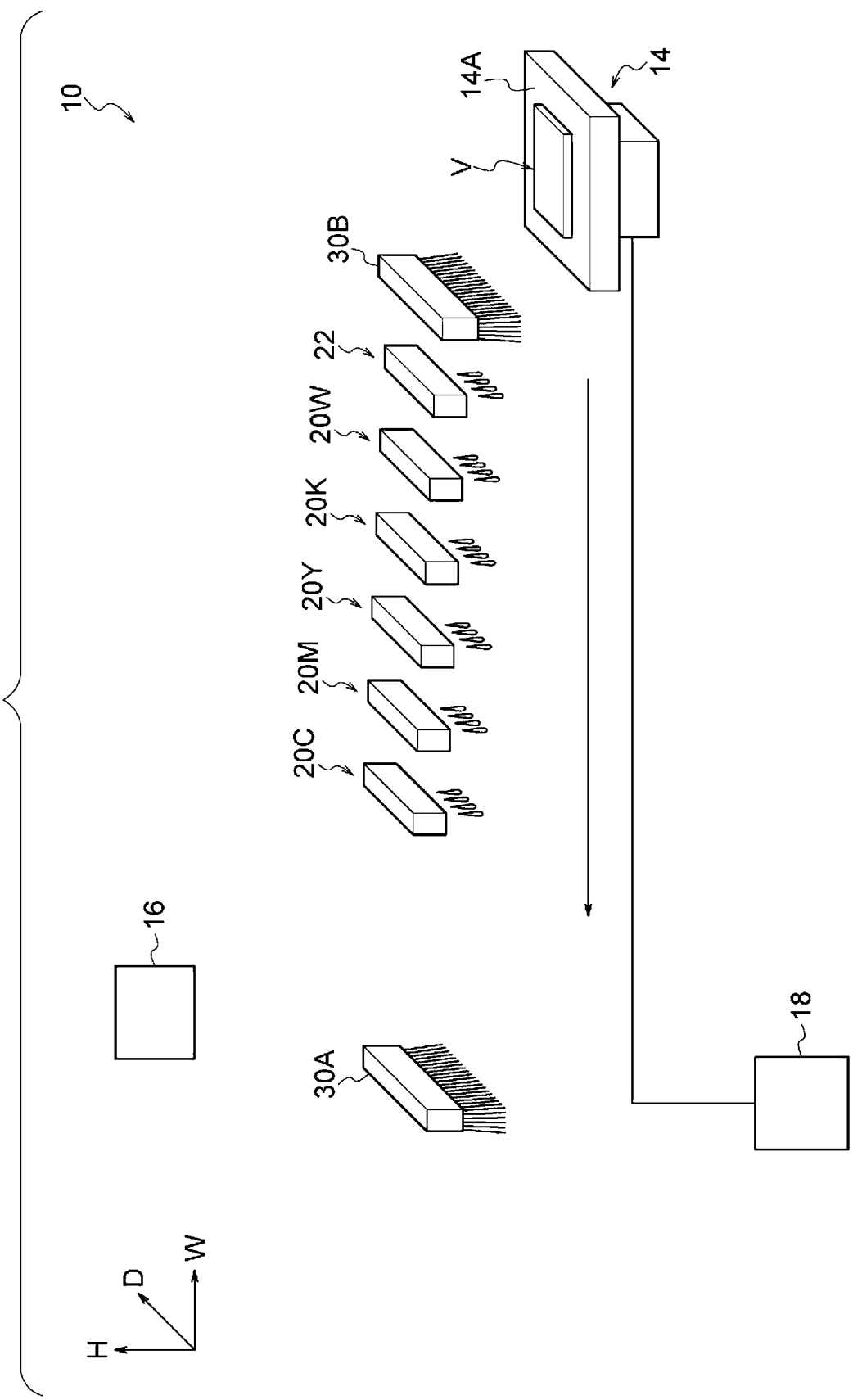
FIG. 8 is a schematic structural view of the shaping apparatus of the first exemplary embodiment.
Figure 9:
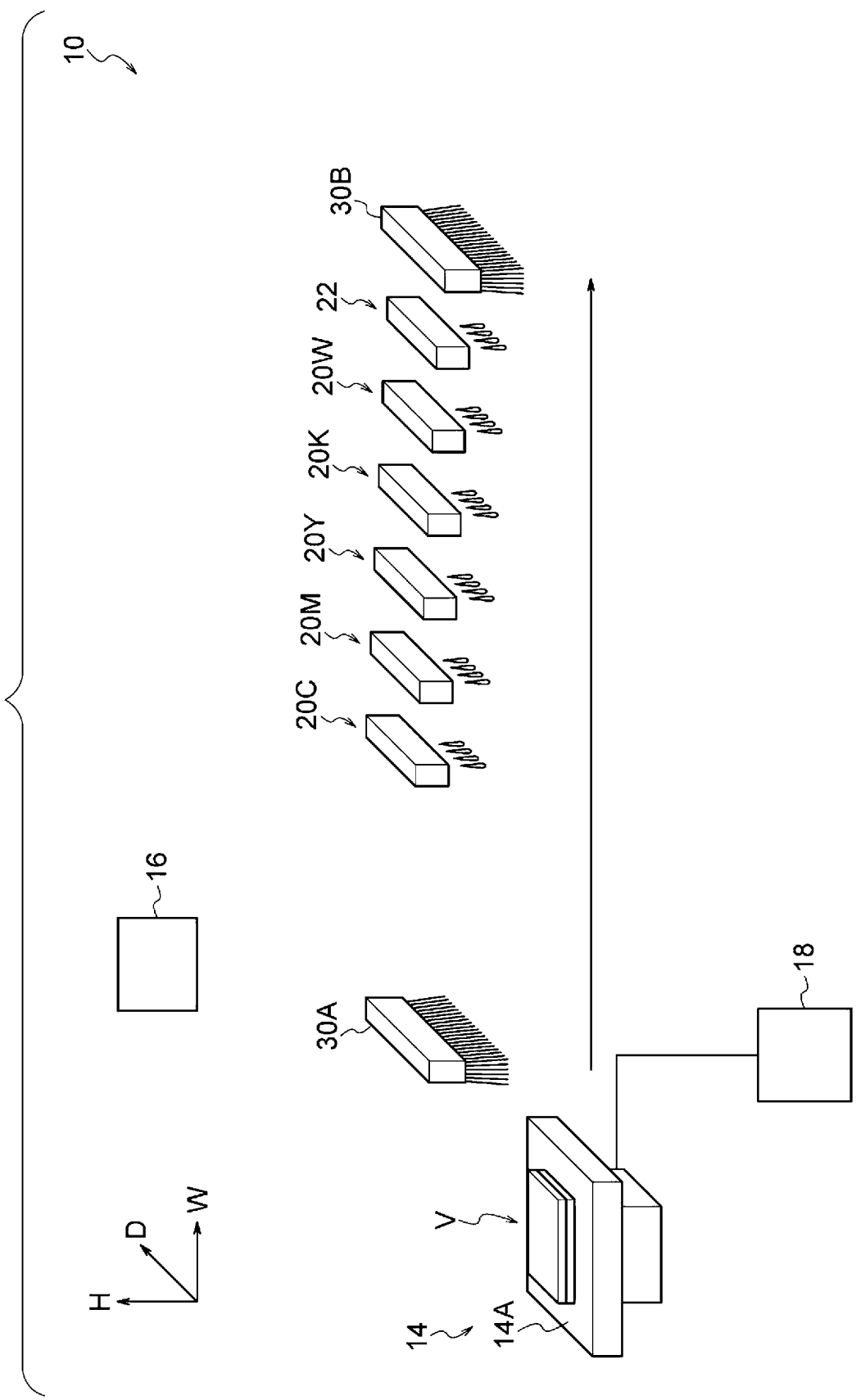
FIG. 9 is a schematic structural view of the shaping apparatus of the first exemplary embodiment.

According to plural layer data created from three-dimensional data on an object V, the controller 16 controls the moving mechanism 18, the discharging parts 20 and 22, and the irradiation parts 30. As illustrated in FIGS. 7, 8, and 9, the controller 16 causes the discharging parts 20 and 22 to discharge droplets onto the base surface 14A while moving the table unit 14 forward and backward relative to the shaping unit 12 in the apparatus width direction (an example of one direction), and further causes the irradiation parts 30 to irradiate the discharged droplets with irradiation light L. The droplets discharged from the discharging parts 20 and 22 onto the table unit 14 land on the base surface 14A of the table unit 14, and are then cured by irradiation with the irradiation light L from the irradiation parts 30.

Specifically, in the shaping apparatus 10, layers formed by curing the color shaping liquids and the coating liquid of the coating member P by irradiation with the irradiation light L are stacked to shape the object V and the coating member P on the base surface 14A of the table unit 14. The cured coating member P is finally removed by the operator.

Shape of Object

Figure 1:
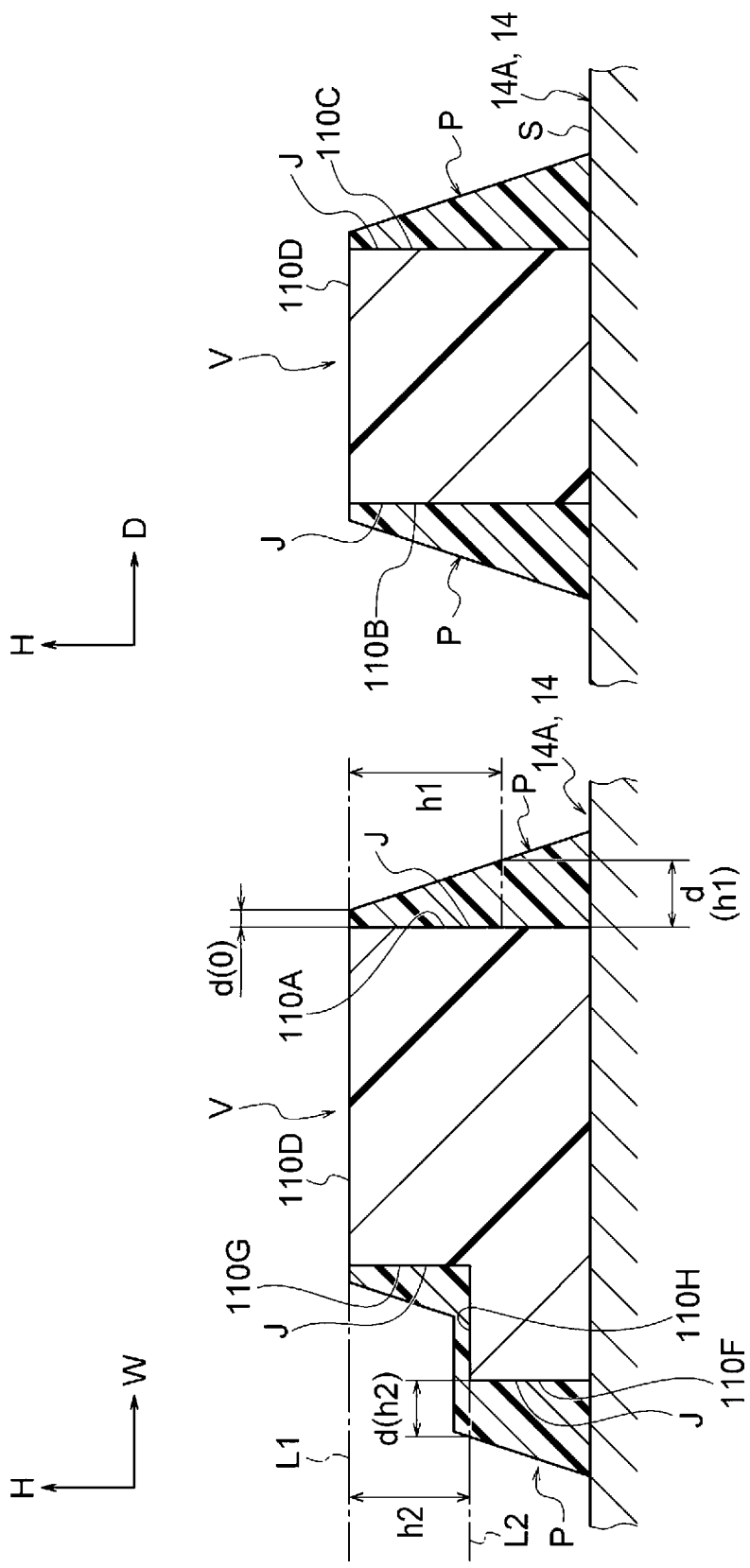
FIGS. 1A and 1B are cross-sectional views of an object and a coating member shaped by a shaping apparatus according to a first exemplary embodiment of the present invention.
Figure 2:
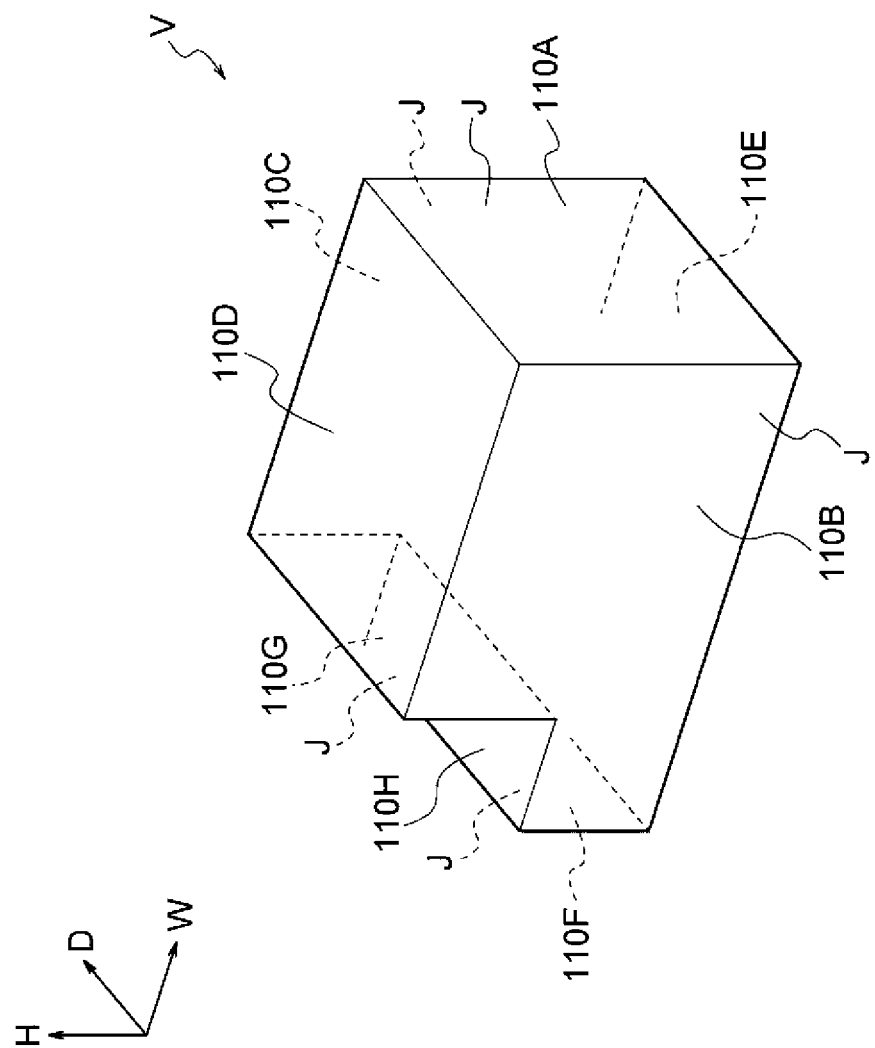
FIG. 2 is a perspective view of the object shaped by the shaping apparatus according to the first exemplary embodiment.
Figure 4A:
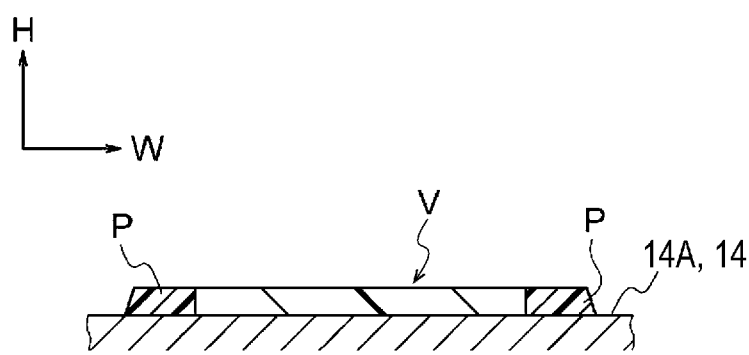
FIGS. 4A, 4B, 4C, and 4D are step views illustrating steps of shaping the object in the shaping apparatus of the first exemplary embodiment.
Figure 4B:
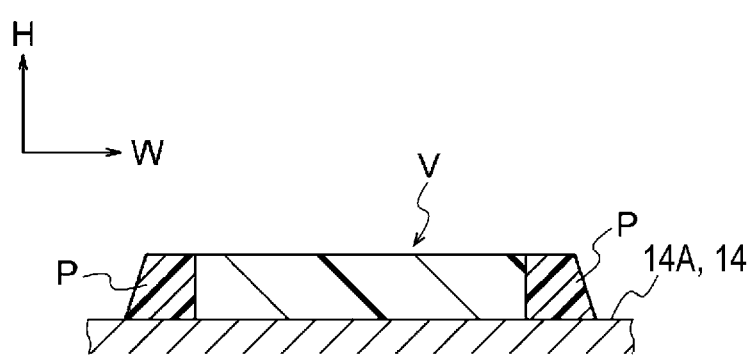
Figure 4C:
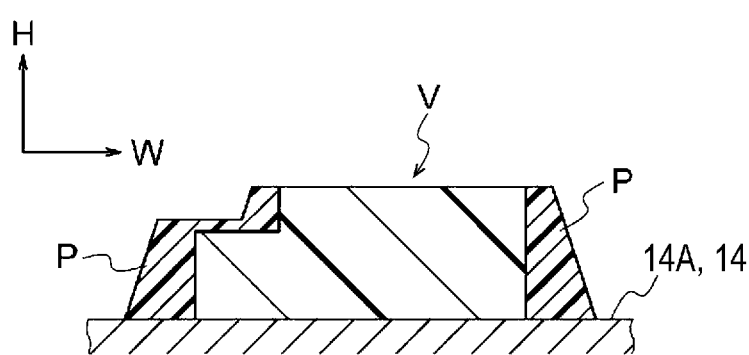
Figure 4D:
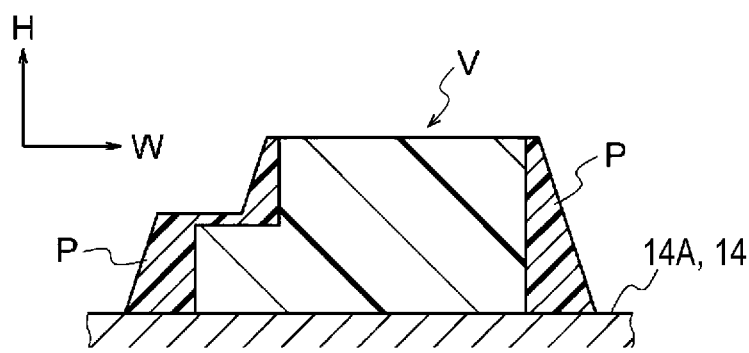

As illustrated in FIGS. 2, 3A, and 3B, the object V is shaped like a rectangular parallelepiped that lacks a part in a stepped form. The object V will be described in conjunction with the direction in which the shaping apparatus 10 shapes the object V.

The object V includes a surface 110A facing toward the other side in the apparatus width direction, a surface 110B facing toward a front side in the apparatus depth direction, a surface 110C facing toward the depth side in the apparatus depth direction, a surface 110D facing upward, and a surface 110E facing downward. The object V further includes surfaces 110F and 110G facing toward one side in the apparatus width direction and a surface 110H disposed between the surfaces 110F and 110G and facing upward.

The surface 110D facing upward is shaped like a rectangle extending in the apparatus width direction.

The surface 110A facing toward the other side in the apparatus width direction is rectangular, and forms a corner portion (ridge line) with the surface 110D. Also, the surface 110A is at an angle θ of 90 degrees to the base surface 14A, and corresponds to an end surface J.

The surfaces 110B and 110C facing in the apparatus depth direction are each shaped like a rectangle that lacks an upper part on the one side in the apparatus width direction. The surfaces 110B and 110C form corner portions (ridge lines) with the surfaces 110D and 110A. Also, the surfaces 110B and 110C are at an angle θ of 90 degrees to the base surface 14A, and correspond to end surfaces J.

The surface 110F facing toward the one side in the apparatus width direction is shaped like a rectangle extending in the apparatus depth direction, and forms corner portions (ridge lines) with the surfaces 110B and 110C. Also, the surface 110F is at an angle θ of 90 degrees to the base surface 14A, and corresponds to an end surface J.

The surface 110G facing toward the one side in the apparatus width direction is disposed above the surface 110F, and is shaped like a rectangle extending in the apparatus depth direction. The surface 110G forms corner portions (ridge lines) with the surfaces 110D, 110B, and 110C. Also, the surface 110G is at an angle θ of 90 degrees to the base surface 14A, and corresponds to an end surface J.

The surface 110H facing upward is disposed between an upper edge of the surface 110F and a lower edge of the surface 110G, and is shaped like a rectangle extending in the apparatus depth direction.

Details of Shaping Method

Next, the shaping method for shaping the object V will be described with reference to a flowchart shown in FIG. 5.

In Step S100, the controller 16 receives three-dimensional data on the object V from, for example, an external apparatus. When the controller 16 receives the three-dimensional data, the procedure shifts to Step S200.

In Step S200, the controller 16 determines whether or not the object V to be shaped according to the three-dimensional data has end surfaces J. When the object V has end surfaces J, the procedure shifts to Step S300. When the object V does not have the end surfaces J, the procedure shifts to Step S310. Since the object V in the first exemplary embodiment has end surfaces J, the procedure shifts to Step S300. Step S310 and subsequent steps performed when the object V does not have the end surfaces J will be described later.

In Step S300, the controller 16 creates three-dimensional data on a coating member P that coats the end surfaces J of the object V. Specifically, the controller 16 creates three-dimensional data on the coating member P so that the thickness of the coating member P decreases toward the upper side.

An example of the shape of the coating member P will be described below in conjunction with a coating member P that coats the surface 110A serving as the end surface J.

To create three-dimensional data on the coating member P that coats the surface 110A illustrated in FIG. 1A, the controller 16 determines the thickness of the coating member P at the uppermost position of the object V (L1 in FIG. 1A). Specifically, the controller 16 takes the thickness of the coating member P at the position L1 in FIG. 1A as d(0). The thickness d0 is preferably more than or equal to 1 to 20 dots of the resolution in the plane, more preferably, 3 to 10 dots. When the thickness is smaller than these values, tilting and color fading sometimes occur. When the thickness is larger than these values, the coating member P is uselessly consumed, and removable of the coating member P is troublesome. A thickness d(h1) of the coating member P at a position spaced downward from L1 is calculated according to the following Expression (1). In other words, the thickness d(h1) of the coating member P is calculated by the following function.

$$d(h1)=d(0)+a \cdot h1 \qquad (1)$$

The coefficient a is a positive value, and for example, 0.05. The coefficient a is preferably within a range of 0.01 to 0.4, more preferably, within a range of 0.05 to 0.2. When the coefficient a is lower than these values, the effect of making the shape close to the designed shape is small. When the coefficient a is larger than these values, the material is uselessly consumed. While the thickness d(h) of the coating member P at the certain height h is given as a linear function of h in Expression (1), it may be given in the form of a high-dimensional function or a table as long as the thickness decreases toward the upper layer. Also, while the thickness of the coating member P is given as the function of h to simplify the calculation, for example, the calculation expression may be different between the surface 110A and the surface 110F. This allows efficient use of the coating member.

In this way, the shape of the coating member P coating the surface 110A is determined.

When the uppermost position (L2 in FIG. 1A) of the surface is distant from the uppermost position (L1 in FIG. 1A) of the object V, as in the surface 110F, three-dimensional data on the coating member P is also created with reference to the uppermost position (L1 in FIG. 1A) of the object V.

Specifically, when the distance between L1 and L2 in FIG. 1A is h2, the thickness d(h2) of the coating member P at the uppermost position of the surface 110F is calculated according to the following Expression (2). In other words, the thickness d(h2) of the coating member P is calculated by the following function.

$$d(h2)=d(0)+a \cdot h2 \qquad (2)$$

In the first exemplary embodiment, one to ten layers of the coating member P are also formed on the surface 110H facing upward and disposed between the surface 110F serving as the end surface J and the surface 110G serving as the end surface J. In this case, since soil of the object falling from above is removed together when the coating member P is removed, a clean object is obtained. When the three-dimensional data on the coating member P is created, the procedure shifts to Step S400.

In Step S400, the controller 16 creates layer data (two-dimensional data) on plural layers from the three-dimensional data on the object V and the coating member P. When all layer data are created, the procedure shifts to Step S500.

In Step S500, the controller 16 controls the moving mechanism 18, the discharging parts 20 and 22, and the irradiation parts 30 according to the plural layer data. The controller 16 causes the discharging parts 20 and 22 to discharge droplets to the table unit 14 and causes the irradiation parts 30 to irradiate the droplets with irradiation light L while moving the table unit 14 forward and backward relative to the shaping unit 12 in the apparatus width direction.

Thus, every time the table unit 14 passes once below the discharging parts 20 and 22, one layer that constitutes the object V is formed on the base surface 14A. By stacking layers on the base surface 14A of the table unit 14, the object V and the coating member P are shaped, as illustrated in FIGS. 4A, 4B, 4C, and 4D. When the object V and the coating member P are shaped, the procedure shifts to Step S600.

In Step S600, the coating member P is removed by the operator by using, for example, a solvent. When the coating member P is removed, all the steps are completed.

In contrast, when the controller 16 determines in Step S200 that the object V does not have the end surface J, the procedure shifts to Step S310. In Step S310, the controller 16 creates layer data on plural layers from the three-dimensional data on the object V. When all layer data are created, the procedure shifts to Step S410.

In Step S410, the controller 16 controls the moving mechanism 18, the discharging parts 20, and the irradiation parts 30 according to the plural layer data. The controller 16 causes the discharging parts 20 to discharge droplets onto the base surface 14A and causes the irradiation parts 30 to irradiate the droplets with irradiation light L while moving the table unit 14 forward and backward relative to the shaping unit 12 in the apparatus width direction. Thus, the object V is formed. When the object V is formed, all the steps are completed.

A description will now be given of a shaping apparatus 210 according to a first comparative example and a shaping apparatus 310 according to a second comparative example. Differences of the shaping apparatus 210 and the shaping apparatus 310 from the shaping apparatus 10 will be principally described.

First Comparative Example

Figure 10:
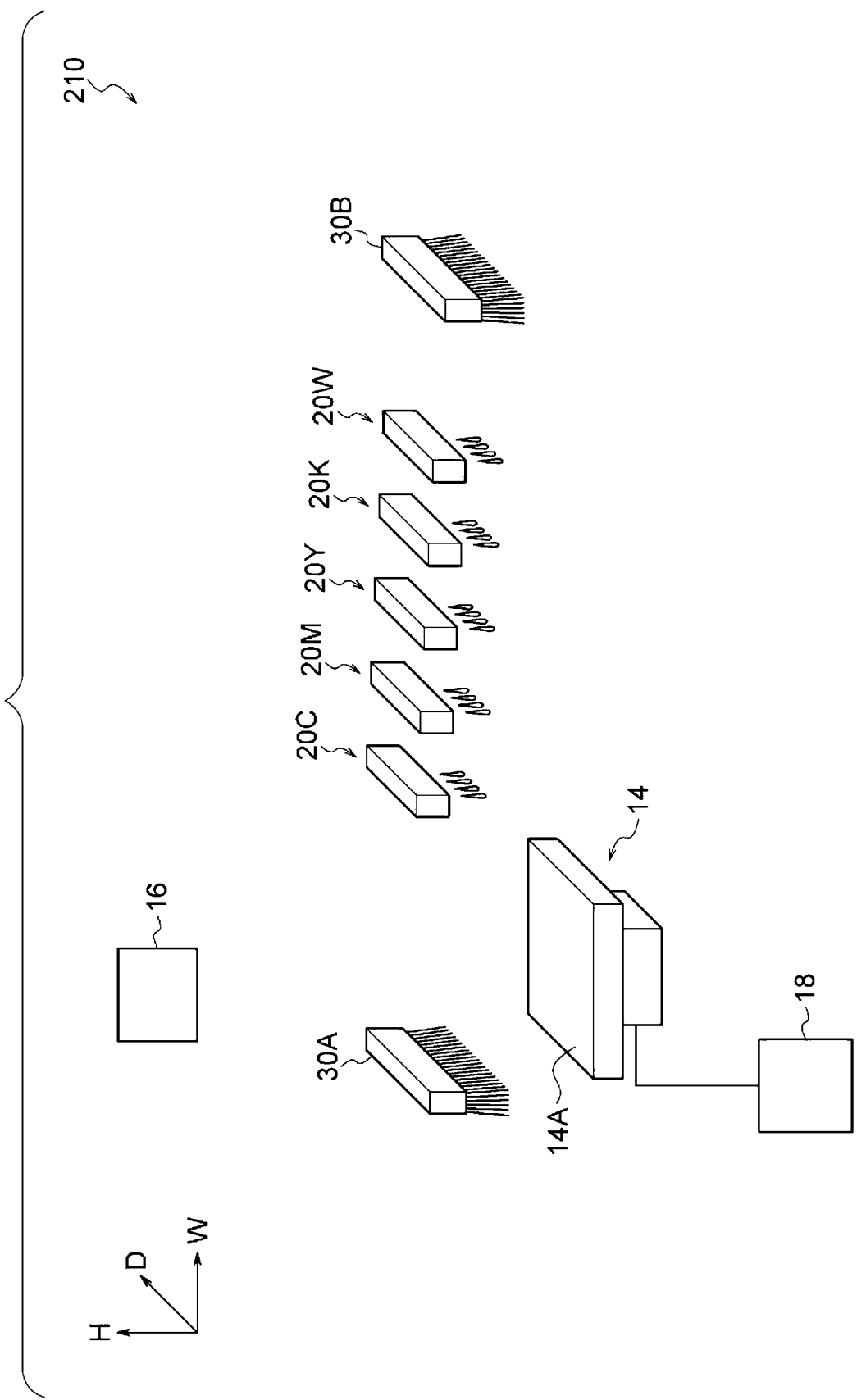
FIG. 10 is a schematic structural view of a shaping apparatus according to a first comparative example of the present invention.

As illustrated in FIG. 10, the shaping apparatus 210 according to the first comparative example does not include a discharging part that discharges droplets of a coating liquid for a coating member P that coats end surfaces J of an object V. For this reason, when the object V is shaped, the end surfaces J of the object V are not coated with the coating member P.

As illustrated in FIGS. 11A and 11B, the end surfaces J of the object V shaped by the shaping apparatus 210 are inclined with respect to the vertical plane.

This is considered because the droplets discharged from the discharging parts 20 fall down from the end surfaces J owing to variations in the landing position and the landing droplets are made spherical by surface tension.

Second Comparative Example

Figure 13:
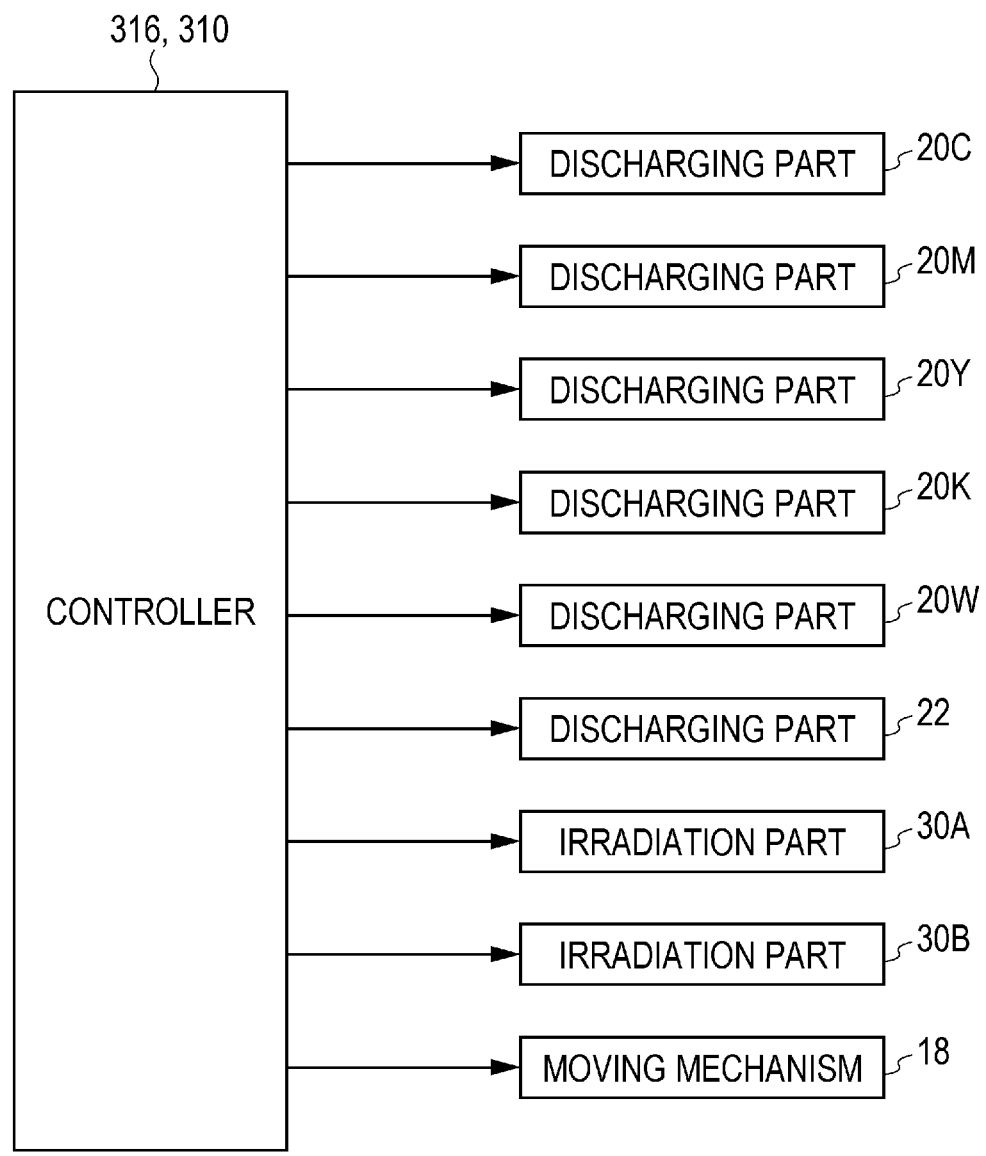
FIG. 13 is a block diagram showing a control system of a controller provided in the shaping apparatus of the second comparative example.

A controller 316 (see FIG. 13) in the shaping apparatus 310 of the second comparative example controls a discharging part 22 so that the thickness of a coating member P is constant from below to above.

An outer surface of the coating member P shaped by the shaping apparatus 310 is inclined with respect to the vertical plane, and the thickness of the coating member P does not remain at a height higher than or equal to a given height. At the height higher than or equal to the given height, end surfaces J of an object V are inclined with respect to the vertical plane (see FIGS. 12A and 12B). Therefore, after the coating member P is removed, upper portions of the end surfaces J of the object V are inclined.

This is considered because the droplets discharged from the discharging parts 20 and 22 fall down from the end surfaces J owing to variations in the landing position and the landing droplets are made spherical by surface tension.

However, as described above, the controller 16 in the shaping apparatus 10 of the first exemplary embodiment decreases the thickness of the coating member P toward the upper side. In other words, the controller 16 increases the thickness of the coating member P toward the lower side.

CONCLUSION

As described above, the shaping apparatus 10 forms the coating member P on the end surfaces J of the object V when shaping the object V. For this reason, the shape of the end surfaces J is maintained more than when the shaping apparatuses 210 and 310 of the comparative examples are used.

Second Exemplary Embodiment

A shaping apparatus according to a second exemplary embodiment of the present invention will be described with reference to FIGS. 14A, 14B, 15A, and 15B. Differences of the second exemplary embodiment from the first exemplary embodiments will be principally described.

A controller in the shaping apparatus according to the second exemplary embodiment extracts end surfaces from three-dimensional data on an object V, and controls discharging parts 20 so that the color of the end surfaces J of the object V is different from the color of the inside of the object V, as illustrated in FIGS. 14A and 14B.

In the shaping apparatus of the second exemplary embodiment, when the object V is shaped, the end surfaces J of the object V are coated with a coating member P, and the thickness of the coating member P decreases toward the upper side. For this reason, the shape of the end surfaces J of the V is close to the designed shape.

Figure 15B:
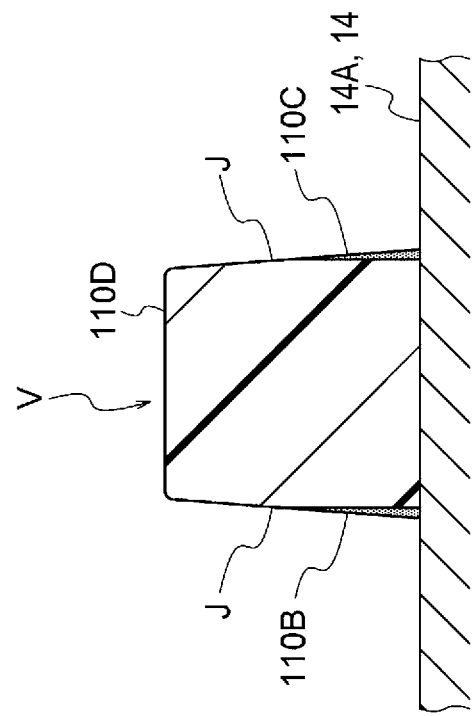
FIGS. 15A and 15B are cross-sectional views of the object shaped by the shaping apparatus of the first comparative example.
Figure 15A:
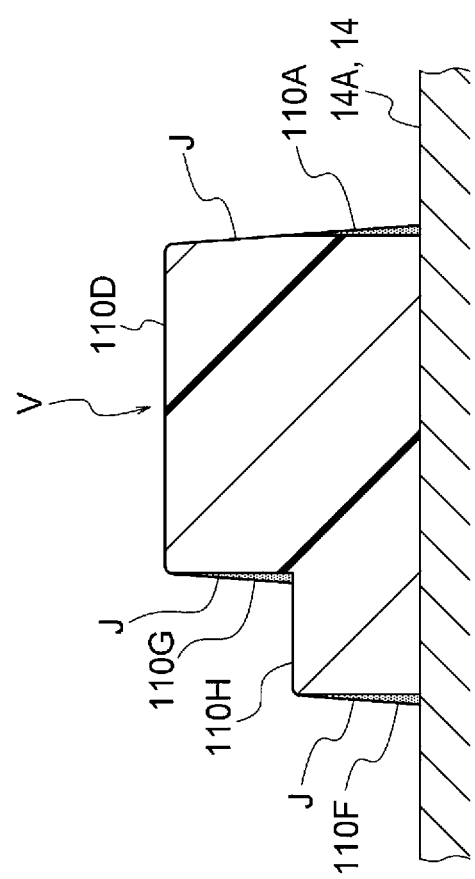

In contrast, when the above-described shaping apparatus 210 of the first comparative example is used, the coating member P coating the end surfaces J is not formed when the object V is shaped. For this reason, as illustrated in FIGS. 15A and 15B, the end surfaces J of the object V are inclined, and the corner portions at the upper ends are rounded. Thus, at the upper ends of the end surfaces J, the color differs (the color of the inside of the object V is exposed on the end surfaces J).

Other operations are similar to those of the first exemplary embodiment.

While the present invention has been described in detail in conjunction with the specific exemplary embodiments, it is obvious to those skilled in the art that the invention is not limited to the exemplary embodiments, and that other various exemplary embodiments can be made within the scope of the invention. For example, although not specifically mentioned in the description of the above exemplary embodiments, when a part of the object overhangs, a support member may be provided to support the overhanging part. In this case, for example, the support member may be constituted by the discharging part 22.

Although not specifically mentioned in the description of the above exemplary embodiments, when the object V is shaped, a flattening roller may be used to flatten the upper surface of the object V.

Although not specifically mentioned in the description of the above exemplary embodiments, when the object V is shaped, the table unit 14 may be moved downward. This may allow the distance between the discharging parts 20 and 22 and the landing positions of the droplets to fall within a predetermined range.

The shaping liquid and the coating liquid are not limited to ultraviolet-curing materials. For example, the shaping liquid and the coating liquid may be discharged in a heated and melted state and cured by cooling, may be cured by irradiation with electromagnetic waves, such as visible light and infrared light, or electron beams, or may be cured by reaction to air and moisture.

While shaping is performed after the three-dimensional shape of the coating member P is found beforehand in the above exemplary embodiments, for example, steps of cutting the object along the horizontal plane at the height h from the uppermost position L1, calculating a pattern in which the coating member P of the width of Expression (1) is added along the outer periphery of the cross section, and forming the object and the coating member on the basis of the pattern may be performed in order from the bottom of the object.

While dissolution using the solvent is used as the method of removing the coating member P, the coating member P may be made of a water-soluble material to be dissolved in water, the coating member P may be made of wax to be removed by heating and melting, or the coating member P may be mechanically pulled off.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A shaping apparatus comprising:
    a table;
    at least one first discharging part configured to move in one direction relative to the table and to shape an object by discharging droplets of a shaping liquid from nozzles and stacking a plurality of layers each formed by curing the droplets;
    a second discharging part configured to move in one direction relative to the table and to form a coating member coating an end surface of the object by discharging droplets of a coating liquid from nozzles and stacking a plurality of layers each formed by curing the droplets; and
    a controller configured to control the second discharging part so that a thickness of the coating member decreases toward an upper side and so that an outer portion, facing away from the end surface, of the coating member is formed at an acute angle at the table,
    wherein the controller is further configured to control the first discharging part to form the end surface such that the end surface is extended, at an angle within a range of 80° to 90° from the table to the upper side of the object.

2. The shaping apparatus according to claim 1,
    wherein the at least one first discharging part includes a plurality of first discharging parts configured to shape one object with shaping liquids of different colors, and
    wherein the controller is further configured to control the plurality of first discharging parts so that a color of the end surface of the object is different from a color of an inside of the object.

3. The shaping apparatus according to claim 1, further comprising:
    an irradiation part configured to cure the droplets discharged to the table by irradiating the droplets with ultraviolet light,
    wherein the coating liquid discharged from the second discharging part is made of an ultraviolet transmitting material and coats a surface of the object facing upward and connected to a lower portion of the end surface.

4. The shaping apparatus according to claim 2, further comprising:
    an irradiation part configured to cure the droplets discharged to the table by irradiating the droplets with ultraviolet light,
    wherein the coating liquid discharged from the second discharging part is made of an ultraviolet transmitting material and coats a surface of the object facing upward and connected to a lower portion of the end surface.

5. The shaping apparatus according to claim 1, wherein the coating member is provided on an outer periphery of the object and has a width given as a function of a height from an uppermost portion of the object.

6. The shaping apparatus according to claim 2, wherein the coating member is provided on an outer periphery of the object and has a width given as a function of a height from an uppermost portion of the object.

7. The shaping apparatus according to claim 1, wherein the controller is further configured to control the first discharging part to form a stepped portion of the object by:
    controlling the first discharging part to form a second end surface opposite the end surface across the object and such that the second end surface is extended from the table towards the upper side at the angle within the range of 80° to 90° with respect to the table,
    controlling the first discharging part to form a surface extended from an uppermost part of the second end surface away from the table and in a direction parallel to the table, and
    controlling the first discharging part to form a third end surface extended from a furthest part of the surface from the uppermost part of the second end surface such that the third end surface is extended from the furthest part to the upper surface at the angle within the range of 80° to 90° with respect to the table, and
    wherein, the upper side is extended, in parallel with the table, from the third end surface to the end surface across the object.

8. The shaping apparatus according to claim 7, wherein the controller is further configured to control the second discharging part to form a stepped portion of the coating member by:
    controlling the second discharging part to form a second outer portion, facing away from the second end surface, of the coating member at an acute angle with respect to the surface,
    controlling the second discharging part to form a surface portion, extended from an uppermost portion of the second outer portion, in parallel with the surface and table, and
    controlling the second discharging part to form a third outer portion, facing away from the third end surface, of the coating member at an acute angle with respect to the surface.

9. The shaping apparatus according to claim 8,
    wherein a thickness of the second outer portion is decreased from the table to the surface portion,
    wherein a thickness of the third outer portion is decreased from the surface portion to the uppermost portion, and
    wherein a thinnest portion of the second outer portion is greater in thickness than a thinnest portion of the third outer portion.

10. The shaping apparatus according to claim 1,
    wherein, in a direction from the table to the upper side, the object comprises a stepped portion such that:
    a thickness of the coating member decreases from the table to the stepped portion,
    the thickness of the coating member is constant across a part of the stepped portion in a direction parallel to the table, and
    the thickness of the coating member is further decreased from the part of the stepped portion to the upper side.

11. A shaping apparatus comprising:
    a table;
    at least one first discharging part configured to move in one direction relative to the table and to shape an object by discharging droplets of a shaping liquid from nozzles and stacking a plurality of layers each formed by curing the droplets;

a second discharging part configured to move in one direction relative to the table and to form a coating member coating an end surface of the object by discharging droplets of a coating liquid from nozzles and stacking a plurality of layers each formed by curing the droplets; and a controller configured to control the second discharging part so that a thickness of the coating member decreases toward an upper side and so that an outer portion, facing away from the end surface, of the coating member is formed at an acute angle at the table, wherein, in a direction from the table to the upper side, the object comprises a stepped portion such that:

a thickness of the coating member decreases from the table to the stepped portion, the thickness of the coating member is constant across a part of the stepped portion in a direction parallel to the table, and the thickness of the coating member is further decreased from the part of the stepped portion to the upper side.

\* \* \* \* \*